United States Patent
Yuta

[11] 4,025,154
[45] May 24, 1977

[54] OPTICAL SCANNING SYSTEM

[75] Inventor: Koichi Yuta, Kokubunji, Japan

[73] Assignee: Olympus Optical Co., Ltd., Tokyo, Japan

[22] Filed: Sept. 23, 1974

[21] Appl. No.: 508,718

[30] Foreign Application Priority Data

Sept. 23, 1973 Japan .............. 48-107199
Sept. 22, 1973 Japan .............. 48-107200
Sept. 22, 1973 Japan .............. 48-107201

[52] U.S. Cl. ..................... 350/7; 350/6; 358/206
[51] Int. Cl.² ..................... G02B 27/17
[58] Field of Search ......... 350/7, 6, 189 B, 184, 350/40, 45, 46, 96 B, 96, 189; 178/7.6; 355/55, 8, 49, 51, 65, 66; 250/203 R, 225

[56] References Cited
UNITED STATES PATENTS

| | | | |
|---|---|---|---|
| 1,994,708 | 3/1935 | Hogan | 178/7.6 |
| 2,262,584 | 11/1941 | Herriott | 178/7.6 |
| 2,536,718 | 1/1951 | Brandon | 350/184 |
| 3,360,659 | 12/1967 | Young | 350/7 UX |
| 3,468,229 | 9/1969 | Bellows | 350/6 |
| 3,652,156 | 3/1972 | Lahr et al. | 350/6 |
| 3,709,602 | 1/1973 | Satomi | 350/6 |
| 3,752,558 | 8/1973 | Lloyd | 350/6 |

*Primary Examiner*—John K. Corbin
*Assistant Examiner*—B. W. de los Reyes
*Attorney, Agent, or Firm*—Cushman, Darby & Cushman

[57] ABSTRACT

An optical scanning system comprising a lens system for focusing an image of respective image information elements in turn, a rotatable reflecting mirror for scanning said image and a correcting means, said correcting means being arranged to scan onto a flat surface when scanning said image onto a scanning surface by rotating said rotatable reflecting mirror.

2 Claims, 17 Drawing Figures

OPTICAL SCANNING SYSTEM

BACKGROUND OF THE INVENTION

1. Field of the Invention

The present invention relates to an optical scanning system for facsimile transmitters, receivers, etc. which carries out optical spot scanning at a high speed by using a rotatable reflecting mirror.

2. Description of the Prior Art

In case of a facsimile receiving devices in general which performs optical spot scanning, scanning of a photosensitive surface (scanning surface) 4 is carried out, as shown in FIG. 1, by a light beam from light source 1, which is modulated by respective image information elements in turn, by using a pinhole 2 and a scanning element 3 comprising a lens system or the like. As the scanning surface in this case is two dimensional, scanning of a flat surface is carried out by combining two linear scanning directions. Out of two dimensions, scanning for one dimension is generally carried out by moving the photosensitive surface along a straight line or by moving the scanning lens along a straight line in the scanning direction by keeping the photosensitive surface fixed. For scanning for the remaining one dimension out of two dimensions, a facsimile head utilizing optical fiber, for example as shown in FIG. 2, is used in most cases. That is, the light beam from the light source 11 is led in turn, by rotating, onto a circular portion 13a which is one end face of an optical fiber 13 by means of a rotary member 12. The light beam led into said circular portion 13a is led to the straight portion 13b, which is the other end portion of the optical fiber 13, and scans the photosensitive surface 14.

FIG. 3 shows another known linear scanning method in which the above-mentioned facimile head utilizing optical fiber is not used. That is, between an objective 33 and the photosensitive surface 34, a reflecting mirror 35 is rotatably arranged. This type of scanning means to rotate a reflecting mirror has various advantages compared with the scanning means by linear movement. That is, as movement for operation is smoother, high-speed scanning is possible and, moreover, the scanning device can be manufactured easily. Especially, when a rotary polyhedric mirror is used instead of simply rotating a reflecting mirror and, moreover, when a powerful light source such as a LASER beam is employed, scanning at still higher speed becomes possible.

However, said scanning method utilizing a rotatable reflecting mirror has a disadvantage that the distance between the lens system and the spot to be scanned is not constant. That is, as shown in FIG. 3, the conjugate position for the pinhole 32 in relation to the lens system 33 is on a circular arc 36 which is drawn by using a point near the intersecting point of the surface of the reflecting mirror 35 and optical axis 33a of the lens system 33 as the center and using the distance B between the center 34a of the photosensitive surface 34 and reflecting mirror 35 as a radius. Therefore, when reference symbol A represents an angle between a line from the center of said reflecting mirror to the center 34a of the photosensitive surface 34 and a line from the center of said reflecting mirror to the outermost portion 34b of the photosensitive surface 34, a distance C between said circular arc 36 and photosensitive surface 34 is expressed by a formula $C = B (\sec A - 1)$. Therefore, when size of the photosensitive surface 34 is about B4 size (approximately 26 × 36 mm) and the distance B is about 400 mm, the angle A becomes about 18°. Therefore, the distance C becomes about 20 mm and out-of-focus phenomenon occurs. Consequently, favourable scanning cannot be attained.

SUMMARY OF THE INVENTION

It is, therefore, a primary object of the present invention to provide an optical scanning system comprising a lens system, a rotatable reflecting mirror and a correcting means and capable of properly scanning onto a flat surface by means of said correcting means.

Another object of the present invention is to provide an optical scanning system comprising a lens system, a rotatable reflecting mirror, and a correcting means arranged to move said lens system simultaneously with rotation of said rotatable reflecting mirror.

Still another object of the present invention is to provide an optical scanning system comprising a lens system, a rotatable reflecting mirror, and a correcting means arranged to move said rotatable reflecting mirror simultaneously with rotation of said rotatable reflecting mirror.

BRIEF EXPLANATION OF THE DRAWINGS

FIG. 1 shows a schematic diagram illustrating an outline of a receiving system for facsimle or the like;

DETAILED DESCRIPTION OF PREFERRED EMBODIMENTS

In the following, the optical scanning system according to the present invention is described referring to preferred embodiments shown on accompanying drawings. A first embodiment is arranged to move the lens system 33 of the known means shown in Fig. 3 by a predetermined value D in the direction along the optical axis of said lens system 33 simultaneously with rotation of the reflecting mirror 35. Said predetermined value D is a value obtained by a formula $D = B (\sec A - 1)$. By arranging as above, out-of-focus phenomenon of the image occurred in the known means is eliminated.

Figure 1:
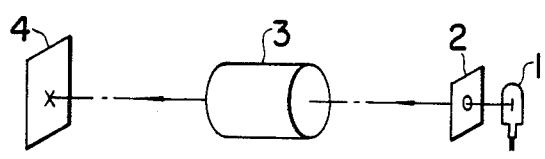
Figure 2:
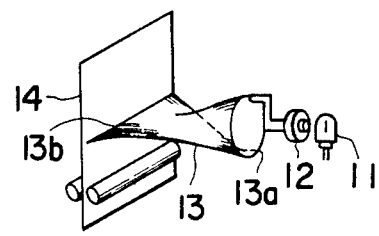
FIG. 2 shows a schematic diagram of known optical scanning system employing optical fiber.
Figure 3:
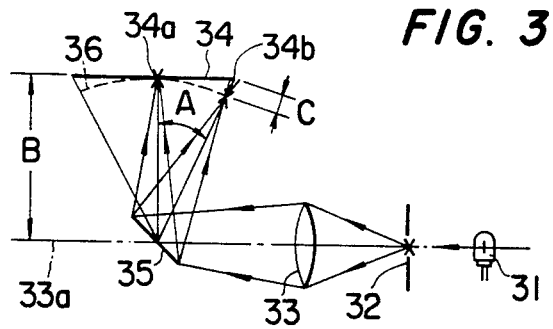
FIG. 3 shows a schematic diagram of known optical scanning system employing a rotatable reflecting mirror.
Figure 4:
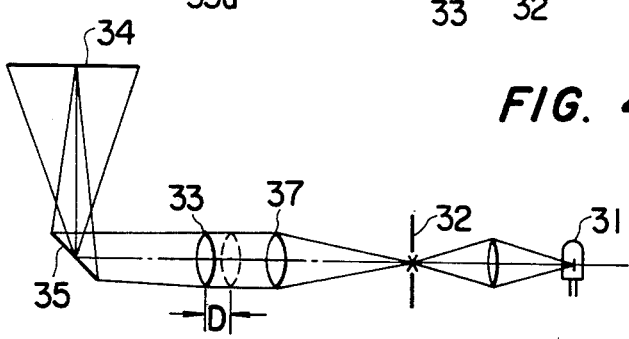
FIG. 4 shows a sectional view of a first embodiment of the optical scanning system according to the present invention.

In the above arrangement, however, the relation among the position of the object, position of the optical system and position of the image changes to some extent and, consequently, magnification of the image also changes. The above-mentioned change of magnification becomes larger when the distance C between the photosensitive surface 34 and circular arc 36 is larger. In case that the distance between the object and image is kept in the same condition, said change of magnification becomes larger when magnification of the lens system 33 is closer to X1. When, for example, the size of the photosensitive surface 34 is B4 and the distance B is 400 mm as mentioned before and if the distance between the pinhole 32 and rotatable reflecting mirror 35 is 400 mm, magnification of the image at the scanning end, i.e., at the end of the photosensitive surface becomes about X1.37 if the lens system is of X1. If magnification of the lens system is X10, magnification of the image at the scanning end becomes about X10.3. Therefore, when an error of magnification to the above extent is nagligible, the optical scanning system arranged as above may be used as it is. When, however, the above-mentioned error causes a significant problem, it cannot be used as it is. FIG. 4 shows a modification of the first embodiment of the present invention arranged to prevent the above-mentioned change of magnification. In said modification, a collimator lens 37 is inserted on the object side of the lens system 33 as shown in FIG. 4. When the lens system 33 only is moved along its optical axis after inserting the collimator lens 37 as above, it is possible to prevent change of magnification caused when the lens system 33 is moved. Besides, if a LASER beam is used as the light source instead of inserting the collimator lens 37, it is evident that change of magnification does not occur even when the optical scanning system shown in FIG. 3 is used as it is.

Figure 5:
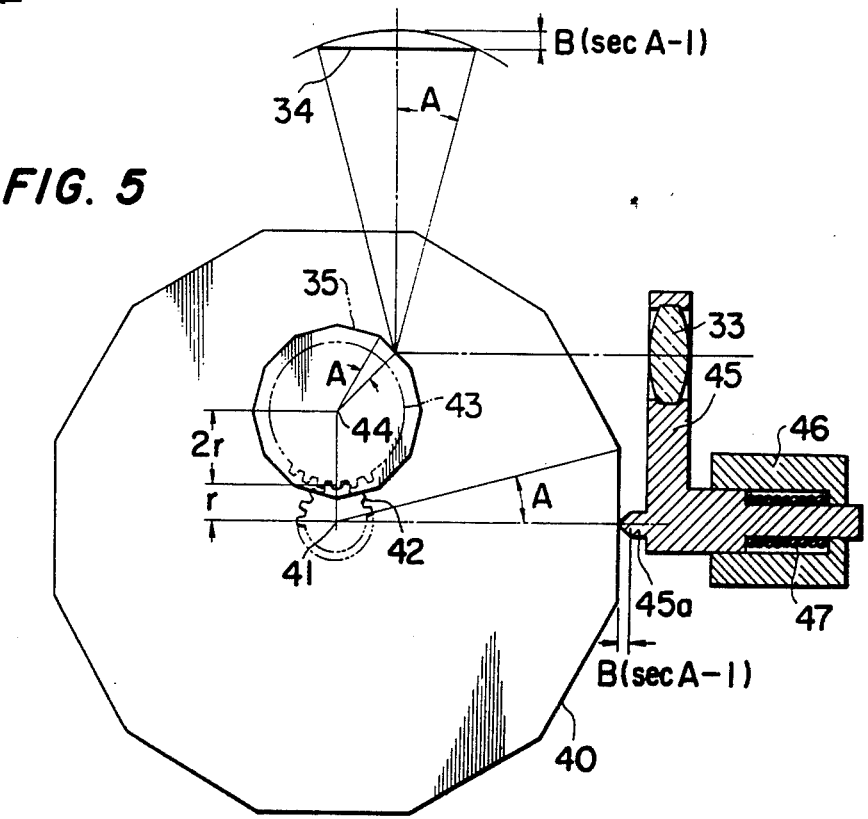
FIG. 5 shows a mechanism for scanning in said first embodiment of the present invention.

A concrete mechanisms for moving the lens system keeping a predetermined relation to rotation of the rotatable reflecting mirror, as described in the above for the first embodiment, is described below. In FIG. 5, numerals 33, 34 and 35 respectively designate the already explained lens system, photosensitive surface and rotatable reflecting mirror. Numeral 40 designates a cam which rotates round a shaft 41, numeral 42 designates a gear fixed coaxially with said cam 40 and numeral 43 designates another gear fixed to a shaft 44 of a rotatable reflecting mirror 35 (a rotary polyhedric mirror in the present embodiment) coaxially with said rotatable reflecting mirror 35. The gear 43 meshes with the gear 42. The diameter of the gear 43 is twice the diameter of the gear 42 and, therefore, the number of teeth of the gear 43 is twice the number of teeth of the gear 42. Numeral 45 designates a lens holder holding the lens system 33 and supported by a supporting member 46. Besides, the lens holder 45 is so arranged that the end of a protuberance 45a provided to said lens holder 45 is always kept in contact with the surface of the cam 40 by means of a spring 47.

Therefore, when the cam 40 is rotated round the shaft 41, the rotatable reflecting mirror 35 is rotated by the gear 42 and gear 43. Because of the above rotation, the distance between the shaft 41 of the cam 40 and the end of the protuberance 45a of the lens holder 45 changes and, consequently, the lens holder 45 moves together with the lens system 33. At that time, rotation of the rotatable reflecting mirror 35 is ½ of rotation of the cam 40. Therefore, when the cam 40 rotates by an angle A, the rotatable reflecting mirror 35 rotates by an angle A/2. On the other hand, as the deflecting angle attained by the reflecting mirror is twice the rotational angle of the rotatable reflecting mirror, the deflecting angle becomes A which is equal to the rotational angle of the cam 40. Moreover, because of rotation of the cam 40 by the angle A, the lens system 33 moves by B $(\sec A - 1)$. Therefore, it is possible to prevent out-of-focus phenomenon of the image caused by the reflecting mirror.

Now, a second embodiment of the optical scanning system according to the present invention is described below. Said second embodiment is arranged to keep the distance from the light source to the image (scanning point) always constant by moving the rotatable reflecting mirror along the optical axis 33a of the lens system simultaneously with rotation of the rotatable reflecting mirror.

Figure 6A:
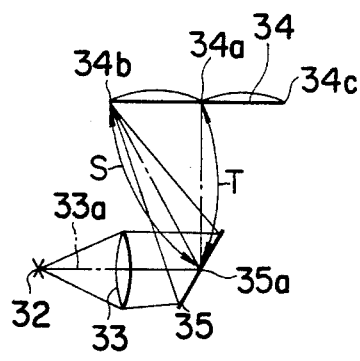
FIGS. 6A, 6B and 6C respectively show sectional views of a second embodiment of the optical scanning system according to the present invention.
Figure 6B:
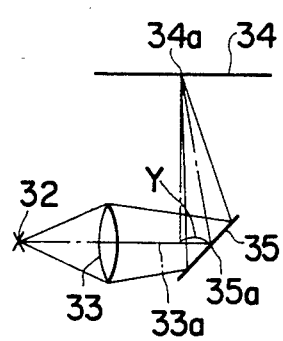
Figure 6C:
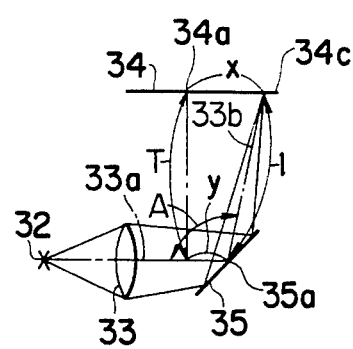

Details of said second embodiment are described below referring to the accompanying drawing. FIG. 6A shows the second embodiment when the scanning point is at the left end position 34b on the photosensitive surface 34. FIG. 6B shows the same embodiment when the scanning point is at the center position 34a on the photosensitive surface 34. FIG. 6C shows the same embodiment when the scanning point is at an arbitrary position on the photosensitive surface 34. In FIG. 6A, let the center 34a of the photosensitive surface 34 represent an origin 0, let reference symbol X represent the right end position 34c and let reference symbol —X represent the left end position 34b. Let reference symbol T represent the distance from the center 34a of the photosensitive surface 34 to the center 35a of the rotatable reflecting mirror 35 and let reference symbol S represent the distance from the left end position 34b of the photosensitive surface 34 to the center 35a of the rotatable reflecting mirror 35. By using the relative position shown in FIG. 6A as the standard, the rotatable reflecting mirror 35 is rotated clockwise from the position shown in FIG. 6A and, at the same time, the rotatable reflecting mirror 35 is moved along the optical axis 33a of the lens system 33, in order to scan the photosensitive surface 34 in turn, until the scanning point comes to the origin 0 as shown in FIG. 6B. Here, let reference symbol Y represent the amount of movement of the rotatable reflecting mirror 35 along the optical axis of the lens system 33 from the position shown in FIG. 6A to the position shown in FIG. 6B. Besides, let reference symbol $l$ represent the distance along the optical axis 33b from the center 35a of the rotatable reflecting mirror 35 to an arbitrary scanning point x at the time when the rotatable reflecting mirror 35 further rotates clockwise in the figure and, at the same time, moves rightward until said arbitrary scanning point $x$ is scanned. If the angle between the optical axis $33b$ and the optical axis $33a$ of the lens system is A and reference symbol $y$ represents the amount of movement of the rotatable reflecting mirror at that time, the angle A and amount of movement $y$ is to be selected so that $l + y$ becomes equal to S. That is, for an arbitrary point $x$, the above-mentioned factors have relation expressed by the following formulas.

$$x + l\cos A = y \quad\quad 1.$$

$$l\sin A = T \quad\quad 2.$$

$$l + y = S \quad\quad 3.$$

From the above three formulas, the relation of $y$ and A to $x$ is obtained as follows.

$$y = \frac{(S-x)(S+x) + T^2}{2(S-x)} \quad (4)$$

$$\sin A = \frac{2(S-x)T}{(S-x)^2 + T^2} \quad (5)$$

Therefore, it is all right when the angle A and $y$ are varied so that formulas (4) and (5) are satisfied. At the position shown in FIG. 6A, $y = 0$. Therefore, from the formula (4), $x$ becomes as follows.

$$x = \pm\sqrt{S^2 - T^2} = \pm X$$

At the position shown in FIG. 6B, $x = 0$. Therefore, from the formula (4), $y$ becomes as follows.

$$y = \frac{S^2 - T^2}{2S} = Y$$

Consequently, A in that case becomes as follows.

$$\sin A = \frac{2ST}{S^2 + T^2}$$

Besides, the formula (4) can be changed as follows.

$$y = \frac{1}{2}\left((x - S) + T^2\frac{1}{(x-S)}\right) + S \quad (6)$$

Figure 7:
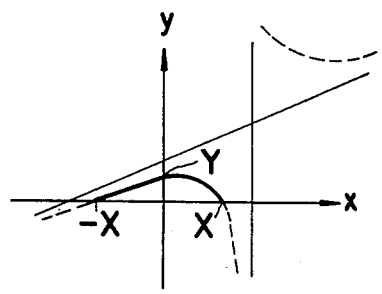
FIG. 7 shows a graph illustrating the relation between the position of the image and amount of movement of the rotatable reflecting mirror in said second embodiment of the present invention.

The formula (6) can be plotted as a hyperbola as shown in FIG. 7. When $$t = \frac{S-x}{T},$$

the formula (5) can be changed as follows.

$$\sin A = \frac{2t}{1 + t^2} \quad (7)$$

Figure 8:
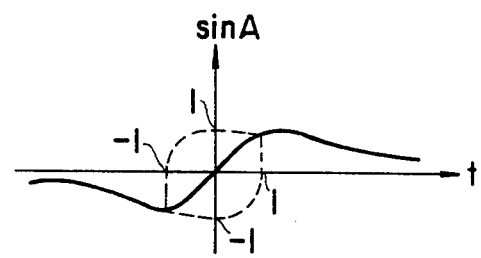
FIG. 8 shows a graph illustrating the relation between the position of the image and rotational angle of the rotatable reflecting mirror in said second embodiment of the present invention.
Figure 9:
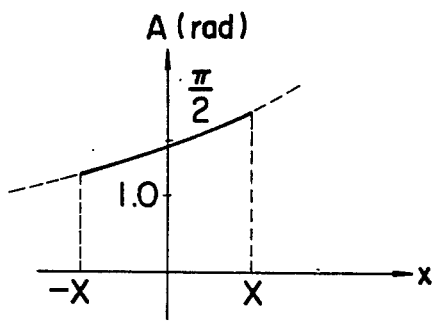
FIG. 9 shows a graph illustrating the relation between the amount of movement and rotational angle of the rotatable reflecting mirror of the said second embodiment of the present invention.

The relation between sin A and $t$ in the above is shown in FIG. 8. FIG. 9 shows the relation between $x$ and A.

When the rotatable reflecting mirror is moved along the optical axis $33a$ of the lens system 33 simultaneously with rotation of the rotatable reflecting mirror 35 so that formulas (4) and (5) are satisfied as described in the above, the distance from the lens system 33 to the scanning point is always kept constant and, therefore, scaning without causing any out-of-focus phenomenon becomes possible.

Figure 10:
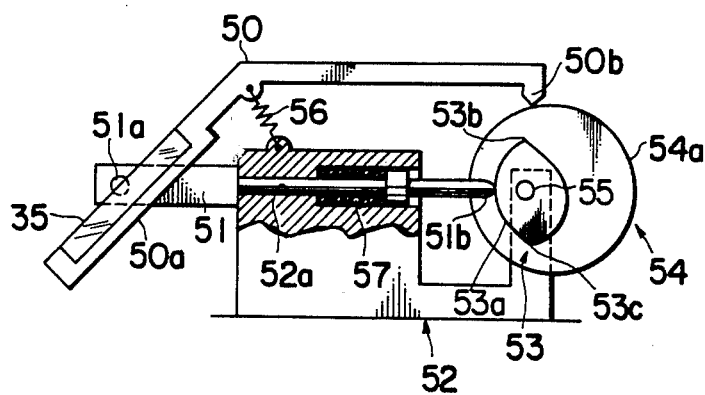
FIG. 10 shows an interlocking mechanism for movement and rotation of the rotatable reflecting mirror in said second embodiment of the present invention.

In the following, an embodiment of a mechanism for making the rotatable reflecting mirror 35 perform such movement which satisfied the above-mentioned relation is described below referring to the drawing. In FIG. 10, numeral 50 designates a lever formed integrally with a holding member 50a for holding the rotatable reflecting mirror 35. Numeral 51 designates a sliding member inserted into a sliding hole 52a provided to a supporting base 52. Said holding member 50a for holding the rotatable reflecting mirror 35 is mounted to the sliding member 51 through a shaft 51a so that the holding member 50a can be rotated round the shaft 51a. Numeral 53 designates a first cam for controlling the movement of the rotatable reflecting mirror 35 along the optical axis of the lens system and numeral 54 designates a second cam for controlling rotation of the rotatable reflecting mirror 35. Said cams 53 and 54 are rotatably mounted to a shaft 55 at one end of the supporting base 52. Numeral 56 designates a spring connecting the lever 50 and supporting base 52. By the spring 56, an end portion 50b of the lever 50 is always kept in contact with the surface of the cam 54. Numeral 57 designates another spring pushing the sliding member 51 rightward in FIG. 10 so that an end portion 51b of the sliding member 51 is always kept in contact with the cam surface 53a of the cam 53. Besides, in the above-mentioned mechanism, the surface 53a of the first cam 53 (on the side to contact the end portion 51b of the sliding member 51 in FIG. 10) has a curve expressed by the formula (4) or (6) and end portions 53b and 53c of said curved surface 53a are decided by the scanning range. The second cam 54 is designed approximately in a circular shape and is eccentrically mounted to the rotary shaft 55. The amount of eccentricity is decided by considering the scanning range, difference of intensity of light between the marginal portion and central portion, etc. Besides, it is evident that the range of the cam surface 54a (the upper portion of the cam 54 in FIG. 10) is also decided according to the scanning range.

When cams 53 and 54 are rotated round the shaft 55 in the above-mentioned mechanism, the rotatable reflecting mirror 35 rotates round the shaft 51a and, at the same time, moves along the optical axis of the lens system. Said rotation and movement are carried out, because of shapes of cam surfaces, so that the already mentioned relation will be satisfied.

Now, a third embodiment of the scanning optical system according to the present invention is described below. The third embodiment is arranged to keep the distance between the lens system for scanning and scanning point on the scanning surface always constant by arranging, between the lens system for scanning and rotatable reflecting mirror, a plural number of other reflecting mirrors as correcting means and by moving some of said plural reflecting mirrors simultaneously with rotation of the rotatable reflecting mirror in order to change the optical distance between the lens system and rotatable reflecting mirror.

Figure 11:
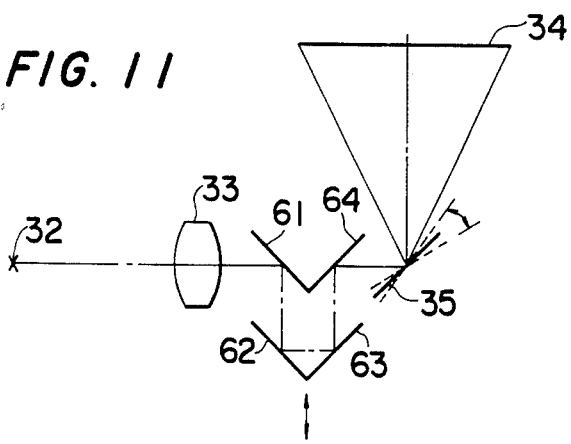
FIG. 11 shows a sectional view of a third embodiment of the optical scanning system according to the present invention.

Detail of the third embodiment is described below referring to the drawing. In FIG. 11, four reflecting mirrors 61, 62, 63 and 64 are arranged between the lens system 33 and rotatable reflecting mirror 35. Out of said reflecting mirrors, the first reflecting mirror 61 and second reflecting mirror 62 are arranged so that their reflecting surfaces become parallel with each other. The third reflecting mirror 63 and fourth reflecting mirror 64 are also arranged so that their reflecting surfaces become parallel with each other. Besides, the first reflecting mirror 61 and fourth reflecting mirror 64 are fixed. The second reflecting mirror 62 and third reflecting mirror 63 are movable integrally with each other in the direction shown by arrowheads in FIG. 11, i.e., in upward and downward direction in FIG. 11, in other words, in the direction in parallel with the optical path between the first and second reflecting mirrors 61 and 62 and with the optical path between the third and fourth reflecting mirrors 63 and 64.

Figure 12A:
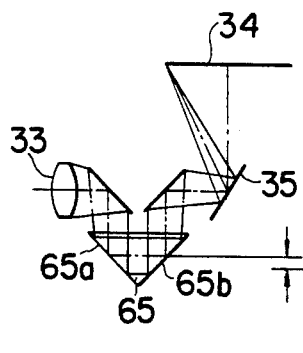
FIGS. 12A, 12B and 12C respectively show sectional views illustrating the relation between rotation of the rotatable reflecting mirror and position of the prism in said third embodiment of the present invention.
Figure 12B:
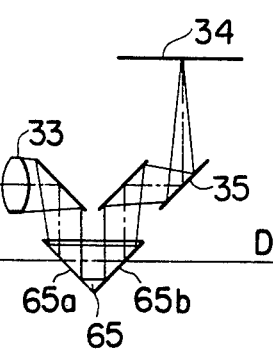
Figure 12C:
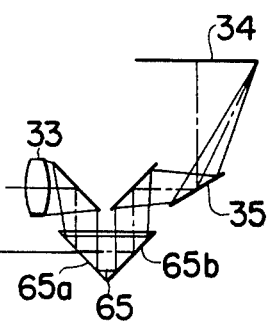

It is also all right to use a prism instead of the above-mentioned two movable reflecting mirrors. FIGS. 12A, 12B and 12C respectively show the relations of the rotatable reflecting mirror and movable reflecting mirrors (a prism is used in these figures) to the scanning position. Out of them, FIG. 12A shows the case when the scanning position is at the left end of the scanning range. FIG. 12B shows the case when the scanning position is at the center of the scanning range. FIG. 12C shows the case when the scanning position is at the right end of the scanning range. In these figures, by using the case when the scanning position is at the center shown in FIG. 12B as the standard, the prism 65 is moved upward by the amount D in both of FIG. 12A and FIG. 12C. (Surfaces 65a and 65b of the prism 65 respectively correspond to said second reflecting mirror 62 and third reflecting mirror 63). The amount of movement D may be selected as a value given by the following formula.

$$D = (B/2)(1 - \cos A) \qquad 8$$

Therefore, scanning can be performed favourably when the prism 65 is moved simultaneously with rotation of the rotatable reflecting mirror 35 to positions which satisfy the formula (8) including the above-mentioned three scanning positions.

Figure 13:
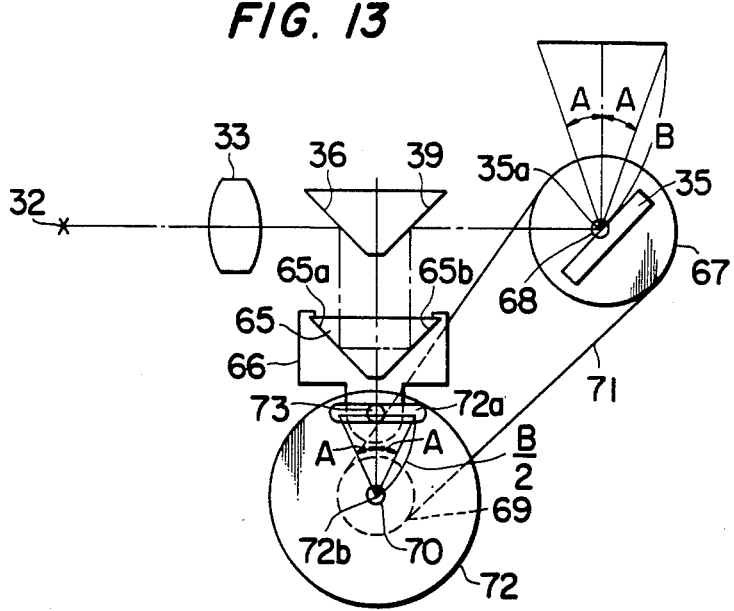
FIG. 13 shows an interlocking mechanism for rotation of the rotatable reflecting mirror and movement of the prism in said third embodiment of the present invention.

In the following, an embodiment of a mechanism for moving the prism 65 in combination with rotation of the rotatable reflecting mirror 35 as described in the above is explained referring to the drawing. In FIG. 13, numeral 66 designates a support for holding the prism 65. Numeral 67 designates a first pulley to which the rotatable reflecting mirror 35 is fixed. The first pulley 67 is rotatable round a shaft 68. Numeral 69 designates a second pulley which is rotatable round a shaft 70. Said first pulley 67 and second pulley 69 have diameters at a ratio of 2 : 1 and are connected to each other by a belt 71. (It is of course all right to use gears instead of the pulleys and the belt.) Numeral 72 designates a disk mounted so that it will rotate integrally with the second pulley 69 and having a pin guide 72a into which a pin 73 fixed to the lower end of the support 66 is to be inserted. Said pin guide 72a is formed so that distances from respective end portions of the pin guide 72 to the center 72b of the disk 72 respectively become a half, i.e., B/2, of the distance B from the center 35a of the rotatable reflecting mirror 35 to respective ends of the surface to be scanned. The other members are same as those described already. Same numerals and reference symbols are given to those portions and members same as those which are described already. Therefore, detailed explanation is omitted here.

Operation of the above-mentioned mechanism is as follows. Pulley 67 is oscillated over the angle required to permit scanning of the scanning surface. During this oscillation, as rotatable reflecting mirror 35 is rotated together with the first pulley 67 for the purpose of scanning, the second pulley 69 is rotated through the belt 71 and, therefore, the disk 72 mounted coaxially with the second pulley 69 is also rotated. Because of this rotation, the prism 65 is moved upward and downward in FIG. 13 by means of the pin guide 72a and pin 73. The relation between the rotational angle of the rotatable reflecting mirror 35 and amount of movement of the prism 65 at that time is as described below. That is, when the rotatable reflecting mirror 35 rotates by angle A/2 (therefore, the deflecting angle of the scanning light beam is A), the disk rotates by the angle A. Consequently, the amount of movement of the prism 65 becomes as follows.

$$B/2 (1 - \cos A)$$

As described in the above according to respective embodiment, the optical scanning system according to the present invention is arranged to scan by using the rotatable reflecting mirror. Therefore, scanning at an extremely high speed is possible. Besides, out-of-focus phenomenon, which tends to occur in this scanning method, is completely prevented and favourable scanning is assured.

In the above, the optical scanning system according to the present invention is described referring to the case of receiving. It is, however, evident that the optical scanning system according to the present invention can be also applied in the same way to the case of transmitting. In case of transmitting, an image is arranged on the scanning surface, on the contrary to the case of receiving, and respective image information elements of said image are focused by said lens system through said rotatable reflecting mirror. By arranging a photoelectric element at the above focusing point in order to receive light, signals from said photoelectric element will be transmitted.

I claim:

1. An optical scanning system comprising a lens system for focusing an image of respective image information elements onto a scanning surface, a rotatable reflecting mirror arranged between said lens system and said scanning surface for the purpose of scanning the image focused by said lens system onto said scanning surface, a holding plate rotatably holding said rotatable reflecting mirror so that said rotatable mirror can be rotated about a shaft of said holding plate, a sliding member fixed to said shaft of said holding plate, a first cam arranged to slide said sliding member by rotation of said first cam thereby moving said rotatable reflecting mirror along the optical axis of said lens system, and a second cam mounted to a rotary shaft of said first cam so that said second cam rotates integrally with said first cam in order to rotate said holding plate and the rotatable reflecting mirror.

2. An optical scanning system comprising a lens system for focusing an image of respective image information elements in turn onto a scanning surface, a rotatable reflecting mirror arranged between said lens system and said scanning surface, a first reflecting mirror arranged between said lens system and said rotatable reflecting mirror in order to deflect the optical axis of said lens system, second and third reflecting mirrors arranged between said first reflecting mirror and said rotatable reflecting mirror, and a means for moving the second and third reflecting mirror; said means for moving the second and third reflecting mirrors comprising a first pulley mounted integrally with said rotatable reflecting mirror, a second pulley connected to said first pulley and arranged so that the diameter thereof is a half of the diameter of the first pulley, a disk fixed to said second pulley and having a pin guide, and a support carrying said second and third reflecting mirrors and having a pin inserted to said pin guide; said second and third reflecting mirrors being moved by rotation of said second pulley for the purpose of varying the optical distance between said lens system and said rotatable reflecting mirror, said optical scanning system being arranged to keep the distance from said lens system to said scanning surface always constant by means for moving said second and third reflecting mirrors in coordination with scanning of the image onto said scanning surface.

* * * * *